United States Patent Office 3,341,009
Patented Sept. 12, 1967

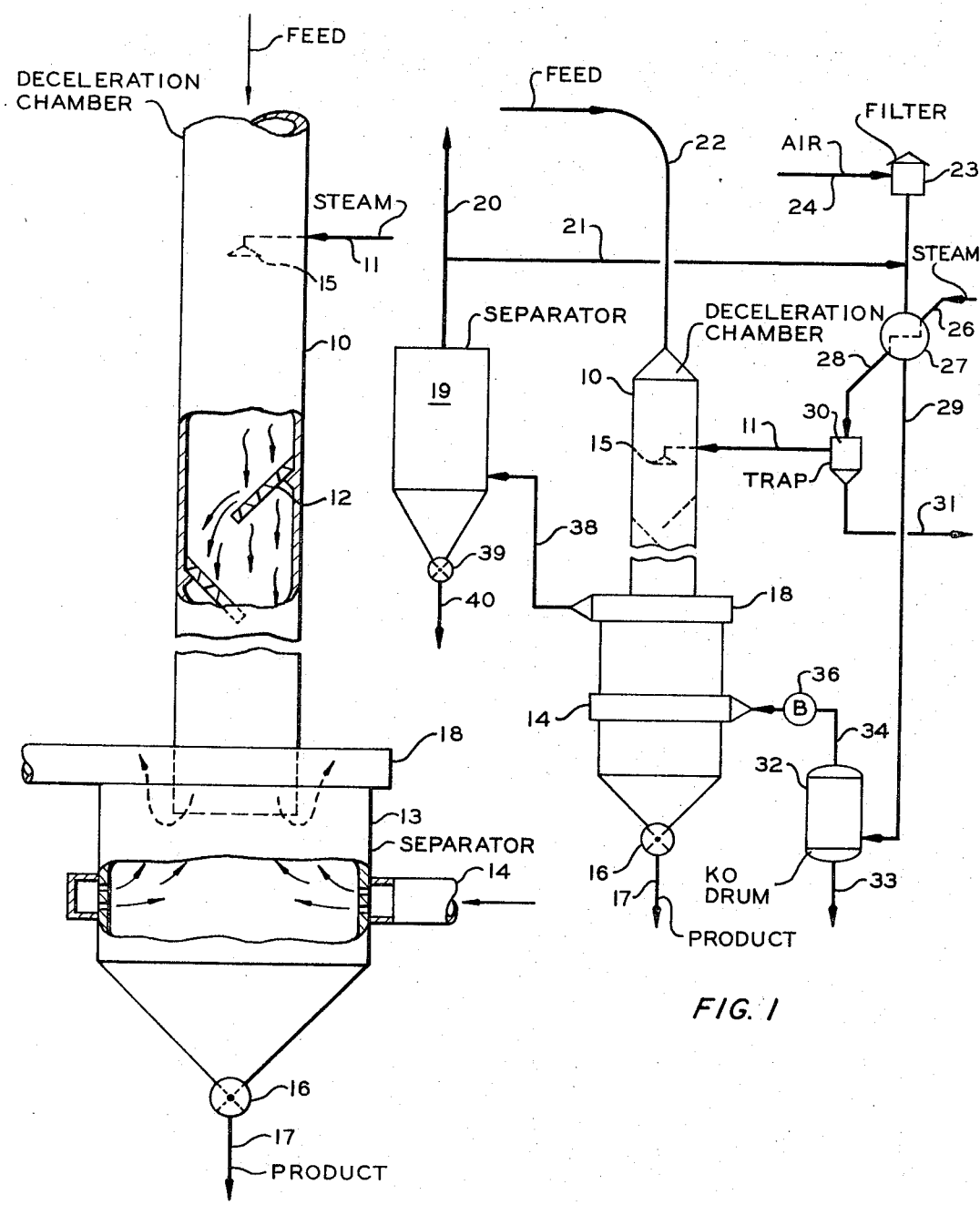

3,341,009
METHOD AND APPARATUS FOR SEPARATING FINES ADHERING TO PELLETS
Richard J. Bennett and Cloral O. Rains, Bartlesville, Okla., assignors to Phillips Petroleum Company, a corporation of Delaware
Filed Sept. 11, 1964, Ser. No. 395,881
8 Claims. (Cl. 209—3)

ABSTRACT OF THE DISCLOSURE

Commingled fines and pellets are separated by contacting a stream of the material, introduced into a deceleration zone at a high velocity, with a vapor capable of conducting an electrostatic charge; impinging the stream of materials onto a series of fixed screens to separate the fines from the pellets; and then disengaging the separated fines from the stream by a low velocity gaseous stream which is flowing countercurrently.

---

This invention relates to a process and apparatus for the separation of solids. In another aspect, this invention relates to a process and apparatus for the separation of fines from pellets. In yet another aspect, this invention relates to a process and apparatus for the separation of fines adhering to pellets by reason of an electrostatic charge and/or mechanical adhesion or cohesion.

In the transfer and storage of solids, such as 1-olefin polymers, in pellet form, undesirable, deleterious, and harmful fines such as dust, adhere to the pellets and are transferred with the pellets. It is necessary that these undesirable fines be separated from the product pellets.

Accordingly, an object of our invention is to provide a solids separation process and apparatus therefor.

Another object of our invention is to provide a process and apparatus for the separation of fines from pellets.

Another object of our invention is to provide a process and apparatus for the separation of fines from 1-olefin polymer pellets.

Other objects, advantages and features of our invention will be readily apparent to those skilled in the art from the following description, and drawing and appended claims.

By our invention, a mixture of pellets and fines is contacted with a vapor capable of conducting an electrical charge, the vapor-contacted pellet and fines mixture passed into a deceleration zone wherein the pellets are separated from the fines by impingement upon a filter screen, and the separated fines and pellets passed from the deceleration zone into a separation zone wherein the separated pellets and fines are contacted with a countercurrent flowing low velocity vaporous stream.

Pellets, as the term is herein applied, are compact solid particles of matter which can be spherical, cylindrical or irregular in shape. Pellet size varies according to specifications within a wide range. Normally, pellets range in size from about 1/16 inch in dimeter by 1/16 inch in length to about 1/8 inch in diameter by 1/8 inch in length.

Fines, as the term is herein applied, refer to relatively small solid particles when compared with pellets and ordinarily have dimensions which are no larger than 1/2 the dimension of the corresponding pellets. Fines can be created by improper manufacture of pellets and by the abrasion of pellets during air transport of pellets within a process plant.

In the drawings,

FIGURE 1 is a schematic representation of one embodiment of the inventive solids separation system.

FIGURE 2 is an elevation, partly in cross-section, of the deceleration chamber 10 and the separation chamber 13 of FIGURE 1.

Although our invention is broadly applicable to the separation of fines from pellets, it is particularly applicable in the separation of fines from solid polymer pellets prepared, for example, from the polymerization of 1-olefins having up to and including 8 carbon atoms per molecule. The polymerization product pellet can be a solid homopolymer or a copolymer, or a mixture thereof. Examples of 1-olefin hydrocarbons which can be employed in the preparation of the polymer pellets are ethylene, propylene, 1-butene, 1-hexene, and 1-octene. Branched chain olefins such as isobutylene can also be employed. Also, 1,1-dialkyl-substituted and 1,2-dialkyl-substituted ethylenes can be employed. Examples of the di- and polyolefins in which the double bonds are in non-conjugated positions and which can be employed in the preparation of the polymer pellets are 1,5-hexadiene, 1,4-pentadiene and 1,4,7-octatriene. Cyclic olefins can also be employed, such as cyclohexene. These solid polymer pellets can be prepared by any known procedure.

Referring to the drawing, the invention will hereinafter be described as applied to the separation of fines from solid polymer product pellets although it is not intended that the invention should be limited thereto. A mixture of polymer pellets and fines is transported through conduit means 22 by air and is introduced into the top of cylindrical deceleration chamber 10. Preferably, although not to be limited thereto, the pellet and fines mixture is introduced into the top of deceleration chamber 10 at a relatively high velocity, a velocity, for example, in the range of 3,000–6,000 feet per minute. Although deceleration chamber 10 is illustrated as a vertical chamber, it is within the scope of this invention to employ a horizontal chamber as a deceleration chamber. It is also within the scope of this invention to transport a mixture of pellets and fines to the top of deceleration chamber 10 to permit the mixture to fall freely downwardly through deceleration chamber 10 without benefit of an initial velocity being imparted to the fines and pellet mixture.

Although air is employed as a transport medium, it is within the scope of this invention to employ other vapors, inert to the flowing fines and pellets, to transport the fines and pellet mixture to the upstream region of deceleration chamber 10.

Deceleration chamber 10 contains multiple means 12 for screening the fines from the pellets flowing downwardly through deceleration chamber 10, each of said screen means 12 depending downwardly at an angle from the inner wall of deceleration chamber 10 as illustrated in FIGURES 1 and 2. Preferably, each of said screen means 12 comprises a bar screen means. Each of said multiple screen means 12 is sized so as to permit the flow of fines through the said screen and to prevent the flow of pellets through the said screen. Each of the screen means 12 is so positioned within deceleration chamber 10 that pellets from the next above adjacent screen means 12 are brought into contact with the next adjacent lower screen means 12, as illustrated in FIGURE 2.

In the upstream region of deceleration chamber 10, the flowing mixture is contacted with an electrical charge-conducting vapor, such as steam, otherwise inert to the flowing pellet and fines mixture and introduced into deceleration chamber 10 via conduit means 11, 15. Other suitable electrical charge conducting vapors include air containing water and metallic vapors. The electrical charge-conducting vapor is dispersed throughout the cross-section of deceleration chamber 10 via dispersing means 15 and is preferably dispersed in a direction concurrent to the flowing pellet and fines mixture. Preferably, when employing steam as the electrically conductive vapor introduced via conduit means 11, the steam is introduced into deceleration chamber 10 at a rate sufficient to maintain a relative humidity within deceleration chamber 10 of at least 60 percent.

The vapor-contacted pellet and fines mixture passes downwardly through deceleration chamber 10 wherein the said mixture is contacted with screen means 12. The pellets are impinged upon screen means 12, the fines passing through screen means 12, and the pellets passing as illustrated in FIGURE 2 to the next lower adjacent screen means 12. Thus, the velocity of the downwardly flowing pellets is reduced, and separation of the fines from the pellets is effected.

The mixture of separated fines and pellets passes from deceleration chamber 10 at a low velocity (preferably below 200 feet per minute) into separator 13 wherein the said mixture is contacted countercurrently with an inert relatively low velocity vaporous stream, such as air, introduced into separator 13 via conduit and dispersing means 14. The low velocity vapor introduced into separator 13 via conduit and dispersing means 14 separates the fines from the downwardly flowing separated fines and pellets mixture and carries the fines from separator 13 to collecting manifold means 18 and from collecting manifold 18 via conduit means 38 to separator 19. Where vapor is employed to transport the pellet and fines mixture to the upstream region of deceleration chamber 10, said vapor and the electrical charge-conducting vapor are also removed from separator 13 via collecting manifold 18 and transmitted to separator 19 via conduit means 38.

Normally, although not to be limited thereto, the velocity of the low velocity vapor at the point of disengagement between the downwardly flowing fines and solids within separator 13 is maintained preferably in the range of 200–400 feet per minute. By maintaining a countercurrent flowing vapor at a low velocity, the passage of pellets with the fines from separator 13 via collecting manifold 18 is prevented.

With steam employed in the upstream region of deceleration chamber 10, preferably the vapor introduced via conduit and dispersing means 14 into separator 13 is heated so as to effectively remove the moisture from the downwardly flowing pellets and to transmit the steam from separator 13 via collecting manifold 18 and conduit means 38. The separated product pellets are passed downwardly to the lower region of separator 13 and are removed therefrom via star valve 16 and conduit means 17.

Within separator 19, the vapor and fines mixture is separated into a vaporous stream withdrawn from separator 19 via conduit means 20 and a fines product stream withdrawn from separator 19 via valve means 39 and conduit means 40.

As illustrated in FIGURE 1, a portion of the vaporous stream withdrawn from separator 19 via conduit means 20 can be passed via conduit means 21 to conduit means 29. Within conduit means 29 the recycled vaporous stream is combined with additional low velocity vapor introduced to conduit means 29 via conduit means 24 and conventional filter means 23. The low velocity vapor employed in FIGURE 1 is air, a preferred vapor to be employed in the separation of fines from pellets within separator 13 although the invention is not to be limited thereto. The vaporous stream is heated via heat exchange means 27 and passed to knock-out drum 32 wherein water or other liquid present in the heated vaporous stream is separated and withdrawn from knock-out drum 32 via conduit means 33. The heated vaporous stream is passed from knock-out drum 32 via conduit means 34 and blower 36 to conduit and dispersing means 14.

Steam is employed to heat the vaporous stream being introduced into heat exchange means 27 via conduit means 26 and withdrawn from heat exchange means 27 via conduit means 28. Water condensed in the steam is separated from the steam via trap 30 and withdrawn from trap 30 via conduit means 31. Steam is transmitted from trap 30 via conduit means 11 to dispersing means 15 in the heretofore described manner.

The following example is presented as illustrative of the objects and advantages of the invention. It is not intended that the invention should be limited to the specific embodiments presented therein.

EXAMPLE

A mixture of 30,000 lbs./hr. of ⅛" diameter by ⅛" length polyethlyene pellets and 12 lbs. per hour of fines is transported by air to cylindrical deceleration chamber 10 at the velocity of approximately 4000 feet/minute. Deceleration chamber 10 is 6" in diameter, 10'0" in length and contains 3 bar screens, each of said screens having a gross projected cross sectional area of 15 sq. in. and having openings ³⁄₃₂" wide. The bar screens depend downwardly from the inner wall of deceleration chamber at an angle of 45° with the horizontal. The bar screens are spaced at 3'0" intervals with the spacing measured from the point of attachment to deceleration chamber 10.

5 p.s.i.g. steam at a rate sufficient to raise relative humidity to 70 percent is introduced into deceleration chamber 10 via conduit means 11. Air at the velocity of 300 feet/minute and at a temperature of 200° F. is introduced into separator 13 via conduit and dispersing means 14.

30,000 pounds per hour of pellets containing 4 pounds per hour of fines is withdrawn from separator 13 via conduit means 17.

The above example clearly demonstrates the effectiveness of the invention to substantially reduce the concentration of fines present in a mixture of pellets and fines.

As will be evident to those skilled in the art, various modifications of this invention can be made, or followed, in the light of the foregoing disclosure, without departing from the spirit or scope thereof.

We claim:
1. Apparatus for separating commingled fines and pellets comprising in combination:
 (a) an elongated deceleration chamber having a closed end and an open end;
 (b) feed conduit means for introducing a high velocity gaseous stream containing commingled fines and pellets into said closed end of said deceleration chamber and directing same towards said open end of said deceleration chamber;
 (c) a series of fixed screen means, longitudinally spaced within and mounted to the inner walls of said deceleration chamber, for separating said fines from said pellets as said high velocity stream containing said commingled fines and pellets impinges thereon, said screen means being sized and positioned so that substantially only fines pass therethrough and said pellets pass to the next adjacent screen means;
 (d) vapor inlet means, disposed within said deceleration chamber downstream of said feed conduit and upstream of said screen means, for introducing and dispersing a vapor capable of conducting an electrostatic charge throughout the cross-section of said deceleration chamber so as to contact said high velocity stream of commingled fines and pellets;
 (e) a separation chamber connected to said open end of said deceleration chamber;
 (f) means for introducing a low velocity gaseous stream into said separation chamber so that the flow of said low velocity gaseous stream is directed towards said closed end of said deceleration chamber;
 (g) means for withdrawing a gaseous stream containing fine particles from said separation chamber; and
 (h) means for withdrawing pellets from said separation chamber.

2. The apparatus according to claim 1 wherein said screen means comprises a series of bar screen means mounted on opposite sides of said deceleration chamber and depending therefrom so as to form an acute angle with the longitudinal axis of said deceleration chamber in the direction of flow of said stream containing commingled fines and pellets.

3. The apparatus according to claim 2 further comprising, in combination:
  (a) a vapor-solid separating means having an inlet, a solids withdrawal means and a vapor outlet;
  (b) first conduit means connecting said separation chamber gaseous stream withdrawal means with said solid-vapor separating means inlet;
  (c) second conduit means, having a heat exchanger, a liquid removal means, and a blower in that order, connecting said solid-vapor separating means vapor outlet with said separation chamber gaseous stream introducing means for recycling vapors from said solid-vapor separating means to said separation chamber;
  (d) a source of vapor capable of conducting an electrostatic charge; and
  (e) third conduit means connected to said spray means for passing said electric-conducting vapor from said source through said heat exchanger, in indirect heat exchange relationship with said recycling vapors, to said spray means.

4. A process for separating commingled fines and pellets comprising:
  (a) introducing commingled fines and pellets in a high velocity gaseous stream into a contact zone;
  (b) contacting said stream containing commingled fines and pellets with a vapor capable of conducting an electrostatic charge within said contact zone, said vapor being dispersed throughout the cross-section of said contact zone;
  (c) passing the resultant vapor-contacted stream from said contact zone to a deceleration zone at a high velocity and decelerating same by impinging onto fixed, multiple screens within said deceleration zone so that the force imparted thereto resulting from the deceleration separates said fines from said pellets;
  (d) passing the resultant stream containing a mixture of said separated fines and pellets from said deceleration zone to a first separation zone;
  (e) introducing a low velocity gaseous stream into said first separation zone and countercurrently contacting same with said resulting stream containing a mixture of separated fines and pellets to disengage the separated fines therefrom;
  (f) withdrawing a low velocity gaseous stream containing said separated fines from said first separation zone; and
  (g) withdrawing separated pellets from said first separation zone.

5. The process according to claim 4 wherein said vapor capable of conducting an electrostatic charge is steam, and said high velocity gaseous stream and said low velocity gaseous stream is air.

6. The process of claim 5 wherein the relative humidity maintained within said deceleration zone is at least 60 percent.

7. The process of claim 6 wherein said pellets comprise 1-olefin polymer pellets.

8. The process according to claim 5 further comprising the steps:
  (a) passing said low velocity air stream from said first separation zone to a second separation zone;
  (b) removing said separated fines from said low velocity air stream in said separation zone;
  (c) withdrawing fines from said second separation zone;
  (d) withdrawing a low velocity air stream from said second separation zone;
  (e) passing said low velocity air stream from said second separation zone to a heat exchange zone;
  (f) passing said steam to said heat exchange zone in indirect heat exchange with said low velocity gaseous stream prior to introduction into said contact zone;
  (g) passing said heated air stream from said heat exchange zone to a third separation zone;
  (h) separating water from said air stream in said third separation zone; and
  (i) withdrawing water from third separation zone, said low velocity air stream comprising the heated air stream from said third separation zone.

References Cited

UNITED STATES PATENTS

| | | | |
|---|---|---|---|
| 1,119,011 | 12/1914 | Grosvenor | 34—78 |
| 2,314,101 | 3/1943 | Phipps | 34—77 |
| 2,579,228 | 12/1951 | Erickson | 209—139 |
| 2,679,316 | 5/1954 | Ruepp | 209—11 |
| 2,956,347 | 10/1960 | Gordon. | |
| 3,112,188 | 11/1963 | Zehnder | 34—77 |
| 3,161,587 | 12/1964 | Bach | 209—3 |

FOREIGN PATENTS 164,259  10/1905  Germany.

FRANK W. LUTTER, *Primary Examiner.*